United States Patent
Morrison et al.

[11] 3,725,420
[45] Apr. 3, 1973

[54] PYRIDYL-β-HYDROXYSULFOXIDES AND SULFONES AND DERIVATIVES

[75] Inventors: Glenn C. Morrison, Dover; John Shavel, Jr., Mendham; Wiaczeslaw Cetenko, Parsippany, all of N.J.

[73] Assignee: Warner-Lambert Company, Morris Plains, N.J.

[22] Filed: Sept. 28, 1970

[21] Appl. No.: 76,288

[52] U.S. Cl. ......260/294.8 F, 260/294.8 G, 424/263
[51] Int. Cl. .............................................C07d 31/50
[58] Field of Search ..............................260/294.8 F

[56] References Cited

OTHER PUBLICATIONS

Science News, Vol. 94, page 319, Sept. 28, 1968.
Science News, Vol. 95, pages 457–458, May 10, 1969.

*Primary Examiner*—Alan L. Rotman
*Attorney*—Albert H. Graddis, Frank S. Chow, Neil D. Edwards, Edward G. Comrie and Anne M. Kelly

[57] ABSTRACT

The present invention relates to pyridyl-β-hydroxy sulfoxides and sulfones having structural formulas:

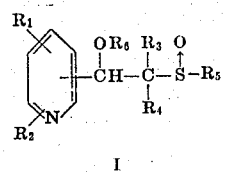

I

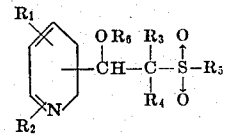

II wherein $R_1$ and $R_2$ are hydrogen, lower alkyl, cycloalkyl, lower alkenyl, aryl, substituted aryl, aralkyl, substituted aralkyl, heterocyclic, substituted heterocyclic, acyl, halogen, lower alkoxy, nitro, mercapto, lower alkylthio, hydroxy, amino, lower alkylamino, dilower alkylamino and the like. $R_3$ and $R_4$ are hydrogen, lower alkyl or aryl. $R_5$ is alkyl up to 12 carbon atoms, aryl, substituted aryl, heterocyclic or substituted heterocyclic. $R_6$ is alkyl of up to 12 carbon atoms or acyl When $R_6$ is hydrogen these compounds are prepared by treating a di alkylsulfoxide or sulfone with a pyridine aldehyde. They can also be prepared by reducing a pyridyl-β-ketosulfoxide, or sulfone, with an alkali metal borohydride. These compounds are useful as immunosuppressive agents.

5 Claims, No Drawings

PYRIDYL-β-HYDROXYSULFOXIDES AND SULFONES AND DERIVATIVES

The present invention relates to pyridyl-β-hydroxy sulfoxides and sulfones having the following structural formulas:

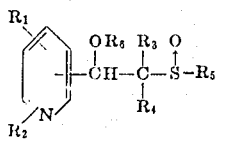 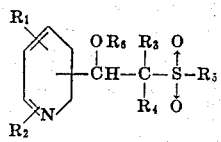

I  II wherein $R_1$ and $R_2$ are hydrogen, lower alkyl, cycloalkyl, lower alkenyl, aryl, substituted aryl, aralkyl, substituted aralkyl, heterocyclic, substituted heterocyclic, acyl, halogen, lower alkoxy, nitro, mercapto, lower alkylthio, hydroxy, amino, lower alkylamino, dilower alkylamino and the like. $R_3$ and $R_4$ are hydrogen, lower alkyl or aryl. $R_5$ is alkyl up to 12 carbon atoms, aryl, substituted aryl, heterocyclic or substituted heterocyclic. $R_6$ is alkyl of up to 12 carbon atoms or acyl.

As used throughout the specification and claims:

The term "lower alkyl" and the lower alkyl portion of lower alkoxy embraces both straight and branched chain alkyl radicals containing from one to six carbon atoms, for example, methyl, ethyl, propyl, isopropyl, n-butyl, n-amyl, n-hexyl, 2-ethylbutyl, 2,3-dimethylbutyl, and the like; the term "lower alkenyl" embraces straight and branched chain alkenyl radicals containing from two to six carbon atoms, for example, vinyl, allyl, 1-butenyl, 1-hexenyl, 2,3-di-methyl-1-butenyl, 2-ethyl-1-butenyl and the like; the term "cycloalkyl" encompasses saturated monocyclic groups having from three to eight carbon atoms such as cyclopropyl, cyclobutyl, cyclopentyl, cyclohexyl, cycloheptyl and cyclooctyl; the term "aryl" denotes a monocyclic aromatic hydrocarbon of six to eight carbon atoms, such as phenyl, tolyl and the like; the term "aralkyl" encompasses lower alkyl groups in which aryl as defined above is substituted for a hydrogen atom, such as for example, benzyl, phenethyl and the like; the term "substituted aryl" means an aryl as defined above in which one or more of the hydrogen atoms of the aryl portion have been substituted by a functional group such as halogen, hydroxyl, lower alkyl, trifluoromethyl, amino, substituted amino, lower alkoxy and the like; the term "substituted aralkyl" means those aralkyl groups having further substituents in their ring portions, such as halogen, hydroxyl, lower alkyl, trifluoromethyl, amino, substituted amino, lower alkoxy and the like; the term "heterocyclic" encompasses those five and six member heterocyclic rings having at least one hetero atom in the ring such as nitrogen, oxygen or sulfur, for example, pyridyl, thienyl, furyl and the like; the term "substituted heterocyclic" are those heterocyclic radicals as defined above having further substituents in their ring portions, for example, by groups such as hydrogen, halogen lower alkyl and lower alkoxy and the like; the term "acyl" means those hydrocarbon carboxylic acids of less than 12 carbon atoms, as exemplified by the lower alkanoic acids (e.g., acetic, propionic, butyric and tert-pentanoic acid), the lower alkanoic acids, the monocyclic aryl carboxylic acids (e.g., benzoic and toluic acids), the monocyclic aryl lower alkanoic acids (e.g., phenacetic and β-phenylpropionic acid), the cycloalkane carboxylic acids and the cycloalkene carboxylic acids; the term "halogen" encompasses all four halogens, such as fluorine, bromine, chlorine and iodine.

The symbols $R_1$, $R_2$, $R_3$, $R_4$, $R_5$ and $R_6$ as used hereinafter have the same meaning as described above.

The biological profile of these compounds is as follows:

These compounds inhibit those immune reactions classified as cell-mediated, delayed type hypersensitivities. These latter include: the late secondary migratory lesions in rats injected with Freund's adjuvant, in accordance with the techniques described in Brit. J. Pharmacol. 21: 127-136 and Brit. J. Pharmacol. 24: 632-640 (1965); the sensitized response to bacterial endotoxin shown in the spleen-cell assay, Jerne et al., Cell-bound Antibodies, Wistar Institute Press, 1963, p. 109; skin transplant rejection in mice and rats and mammary gland rejection in rats, Billingham, Transplantation of Cells and Tissues, Wistar Institute Press, 1961, p. 1; contact and protein hypersensitivities in guinea pigs, rabbits and rats, Uhr, Physiol. Rev. 46: 359-419. The compounds of this invention, as well as their corresponding acid addition salts, N-oxides and quaternary ammonium salts, showed, at a dosage range of about 1 to 1,000 mg/kg, typically 25 to 100 mg/kg, three or four times daily, orally or by injection, depending on the host, effectiveness in suppressing these various expressions of the delayed hypersensitivity immunological response.

As far as toxicity is concerned, these compounds of this invention have extremely low toxicity, for example, oral administration at a dose of 5 g/kg or intravenous injection at a does of 1 g/kg to mice produces no deaths.

In order to use these compounds, they may be combined with inert pharmaceutical excipients, such as lactose, mannitol, starch, and formulated into dosage forms such as tablets, capsules and the like. For parenteral administration, these compounds may be formulated with an inert parenterally acceptable vehicle, such as water, saline, sesame oil and the like. These various pharmaceutical dosage forms are compounded by methods well known to the pharmacist's art.

According to the present invention, these compounds of this invention wherein $R_6$ is hydrogen, are prepared by two methods. The first method involves treating a dialkyl sulfoxide or sulfone with a pyridine aldehyde. The second method involves reducing a pyridyl-β-ketosulfoxide or sulfone with an alkali metal borohydride. The reactions may be represented by the following diagram:

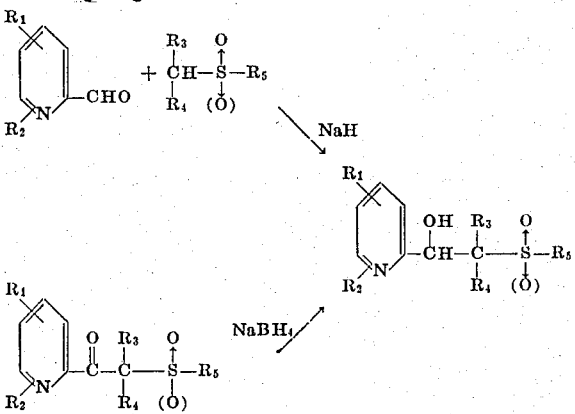

These compounds wherein $R_6$ is alkyl are prepared by treating the above compounds wherein $R_6$ is hydrogen with sodium hydride and an alkyl halide. Those compounds where $R_6$ is acyl are prepared by treating those compounds wherein $R_6$ is hydrogen with an acyl halide.

The following Examples are included to further illustrate the practice of this invention.

EXAMPLE 1

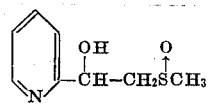

α-[(Methylsulfinyl)methyl]-2-pyridinemethanol.
Method A

To a solution of 55 g of 2-[(methylsulfinyl)acetyl] pyridine in 1.2 l of water was added a solution of 3.5 g of sodium borohydride in 30 ml of water while the temperature was maintained at 20°–25° with icebath cooling. After the addition had been completed, stirring was continued for 3 hours. The reaction mixture was saturated with sodium chloride and extracted with chloroform. The chloroform layer was dried over sodium sulfate and the solvent was removed. Four recrystallizations of the residue from ethyl acetate gave 10 g (18 percent of a crystalline solid (Isomer A) mp 111.5°–112.5°.

Anal. Calcd for $C_8H_{11}NO_2S$: C, 51.87; H, 5.99; N, 7.56; S, 17.31. Found: C, 51.70; H, 5.91; N, 7.62; S, 17.44.

On concentration of the mother liquor from the second recrystallization, there was deposited a solid, which after three more recrystallizations from ethyl acetate, afforded 3.0 g (5 percent) of a solid (Isomer B) mp 74°–75°.

Anal. Calcd for $C_8H_{11}NO_2S$: C, 51.87; H, 5.99; N, 7.56; S, 17.31. Found: C, 51.69; H, 5.95; N, 7.40; S, 17.37.

Method B

A mixture of 13.9 g of sodium hydride and 150 ml of dimethyl sulfoxide was heated at 72° until hydrogen evolution ceased. A solution of 32.1 g of picoline aldehyde was added over a 25 min. interval at 20°–25°. After the addition had been completed, stirring was continued for 2 hours at room temperature. The reaction mixture was poured onto 300 g of ice and the pH of the solution was adjusted to 7 with hydrochloric acid. The solution was saturated with sodium chloride and extracted with chloroform. The chloroform solution was dried over sodium sulfate and the solvent was removed. Trituration of the residue with petroleum ether followed by recrystallization from ethyl acetate gave 10.3 g (18 percent) of isomer A mp 111.5°–112.5°. The mother liquor was concentrated and on standing there was deposited 8.5 g (15 percent) of isomer B mp 74°–75.

EXAMPLE 2

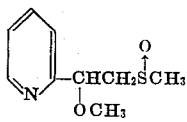

2[1-Methoxy-2-(methylsulfinyl)ethyl] pyridine

To a suspension of 5.98 g of sodium hydride in 70 ml of dimethyl formamide was added a solution of 26.4 g of isomer A of α-[(methylsulfinyl)methyl]-2-pyridinemethanol in 100 ml of dimethyl formamide at 15°–20°. The mixture was stirred at the room temperature for 35 min. To the resulting solution was added 21.4 g of methyl iodide in 20 ml of dimethyl formamide at 15°–20 over a 10 min. interval. After the addition had been completed, stirring was continued for an additional 3 hours at room temperature. The reaction mixture was poured into 400 ml of cold water and extracted with chloroform. The chloroform solution was dried over sodium sulfate and the solvent was removed. The residue was chromatographed on alumina. Elution with ethyl acetate gave, after recrystallization from ether, 17 g (62 percent) of a solid mp 65°–66°.

Anal. Calcd. for $C_9H_{13}NO_2S$: C, 54.25; H, 6.58; N, 7.03; S, 16.09. Found: C, 54.09; H, 6.58; N, 7.08; S, 16.16.

Subjection of 16.1 g of isomer B of α[(methylsulfinyl) methyl]-2-pyridinemethanol to the procedure for isomer A gave 18 g of an oil. Chromatography on Silica Gel gave, on elution with chloroform, 13.3 g of an oil. To a solution of the base in 1.4 l of ether was added a solution of 9.46 g of perchloric acid in 25 ml of ethanol. There was deposited a 17.9 g of a solid mp 164° dec. Recrystallization from methanol gave an analytical sample mp 164°–165°.

Anal. Calcd. for $C_9H_{13}SO_2 \cdot HClO_4$: C, 36.07; H, 4.71; N, 4.67; S, 36.07; Cl, 11.83. Found: C, 36.10; H, 4.74; S, 10.87; N, 4.85; Cl, 11.89.

EXAMPLE 3

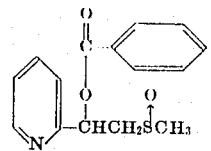

2-[1-0-Benzoyl-2-(methylsulfinyl)ethyl] pyridine (isomer A)

To a suspension of 1.10 g of 57 percent oil dispersed sodium hydride in 15 ml of anhydrous dimethyl formamide was added a solution of 5.00 g of 2-[1-hydroxy-2-(methylsulfinyl)ethyl] pyridine (isomer A) in 30 ml of dimethyl formamide dropwise at 0° over a period of 15 min. under a nitrogen atmosphere. The reaction was stirred for an additional 30 min. during which it was allowed to warm to ambient temperature. The solution was again cooled to 0°, and a solution containing 3.79 g of benzoyl chloride in 25 ml of dimethyl formamide was added dropwise over a 15 min. interval. The resulting mixture was allowed to warm to room temperature and to stir for 24 hours. The mixture was poured into 100 ml of ice water and extracted several times with chloroform. The combined organic extracts were dried over anhydrous sodium sulfate and the solvent was evaporated in vacuo to afford a dark brown oil. The oil was trituration with ether, and the resulting crystals were collected to yield 2.55 g (34 percent) of a solid, mp. 155°–156°. Three recrystallizations from ethyl acetate gave an analytical sample, mp. 160°–161°.

Anal. Calcd. for $C_{15}H_{15}NO_3S$: C, 62.26; H, 5.23; N, 4.84; S, 11.08. Found: C, 62.60; H, 5.19; N, 4.76; S, 11.13.

EXAMPLE 4

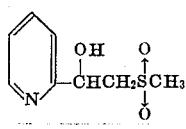

2-[(Methylsulfonyl)methyl]-2-pyridinemethanol

To a stirred solution of 54.9 g of 2-[(methylsulfonyl)acetyl]pyridine in 2.4 l of 80 percent aqueous methanol cooled to 10° was added in several portions 2.77 g of sodium borohydride. The temperature rose to 17° during addition. The mixture was stirred at room temperature for 5 hr. and then the methanol was removed by distillation at reduced pressure. The aqueous residue was extracted with chloroform. The combined chloroform extracts were dried over sodium sulfate and the solvent was removed by distillation at reduced pressure. There was obtained 50.2 g (92 percent) of a solid. Recrystallization from ethanol gave analytical sample, mp. 154°–55°.

Anal. Calcd for $C_8H_{11}NO_3S$: C, 47.75; H, 5.51; N, 6.96; S, 15.93. Found: C, 47.97; H, 5.48; N, 6.87; S, 15.66.

We claim:

1. A member selected from the group consisting of compounds of the formulas:

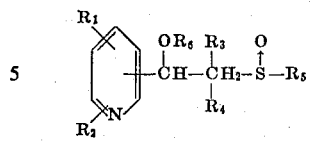 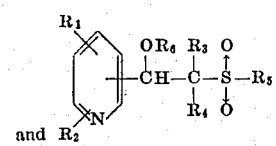

wherein $R_1$ and $R_2$ are hydrogen, $R_3$ and $R_4$ are each a member selected from the group consisting of hydrogen, lower alkyl and phenyl; $R_5$ is alkyl up to 12 carbon atoms; $R_6$ is a member selected from the group consisting of alkyl of up to 12 carbon atoms, acyl of a lower alkanoic acid, and benzoyl, and the sulfoxide chain is attached in the α position of the pyridyl ring; its pharmaceutically acceptable acid addition salts, and its N-oxide.

2. A compound according to claim 1 which is α-[(Methylsulfinyl)methylf7-2-pyridinemethanol.

3. A compound according to claim 1 which is 2[1-Methoxy-2-(methylsulfinyl)ethyl] pyridine.

4. A compound according to claim 1 which is 2-[1-0-Benzoyl-2-(methylsulfinyl)ethyl] pyridine.

5. A compound according to claim 1 which is 2-[(Methylsulfonyl)methylfu-2-pyridinemethanol.

* * * * *